United States Patent [19]
Hope et al.

[11] Patent Number: 6,161,345
[45] Date of Patent: Dec. 19, 2000

[54] TORNADO SHELTER

[76] Inventors: Ted C. Hope; Edward P. Michels, both of 100 S. Shawnee, Catoosa, Okla. 74015

[21] Appl. No.: 09/389,116

[22] Filed: Sep. 2, 1999

[51] Int. Cl.[7] .................................................. E04H 9/14
[52] U.S. Cl. ............................... 52/169.6; 52/20; 49/228
[58] Field of Search ................................. 52/19, 20, 21, 52/169.6; 49/228; 109/15

[56] References Cited

U.S. PATENT DOCUMENTS

| | | | |
|---|---|---|---|
| 3,114,153 | 12/1963 | Pierson | 52/169.6 X |
| 4,955,166 | 9/1990 | Qualline et al. | 52/169.6 |
| 5,732,512 | 3/1998 | Ueno et al. | 52/20 X |
| 5,953,866 | 9/1999 | Poole | 52/19 X |

*Primary Examiner*—Janet M. Wilkens
*Assistant Examiner*—Michael J. Fisher
*Attorney, Agent, or Firm*—William S. Dorman

[57] ABSTRACT

A tornado shelter having a rectangular horizontal top, a rectangular horizontal bottom disposed below and parallel to the top, a vertical forward end connected transversely the top and bottom, a vertical rear end connected transversely to the top and bottom opposite from the forward end, a pair of vertical side members connecting the top and the bottom on opposite sides thereof and extending longitudinally from the rear end to the front end, a substantially rectangular door frame connected to the top adjacent the front end, an access opening in the top communicating with the interior of the door frame, longitudinally extending tracks mounted in the door frame, a flat horizontally extending door adapted to be mounted in the door frame, the door having rollers thereon adapted to engage the tracks on the ledge, the door being mounted in closed position over the opening in the top when the door is adjacent the front of the tornado shelter, a latch mechanism attached to the forward edge of the door for securing the door to the front end, a cover plate having vent holes therein covering the rear portion of the door frame, the latch being release able for rolling the door rearwardly into position underneath the cover plate and exposing the access opening in the top so that entry and egress came be achieved with respect to the tornado shelter.

5 Claims, 7 Drawing Sheets

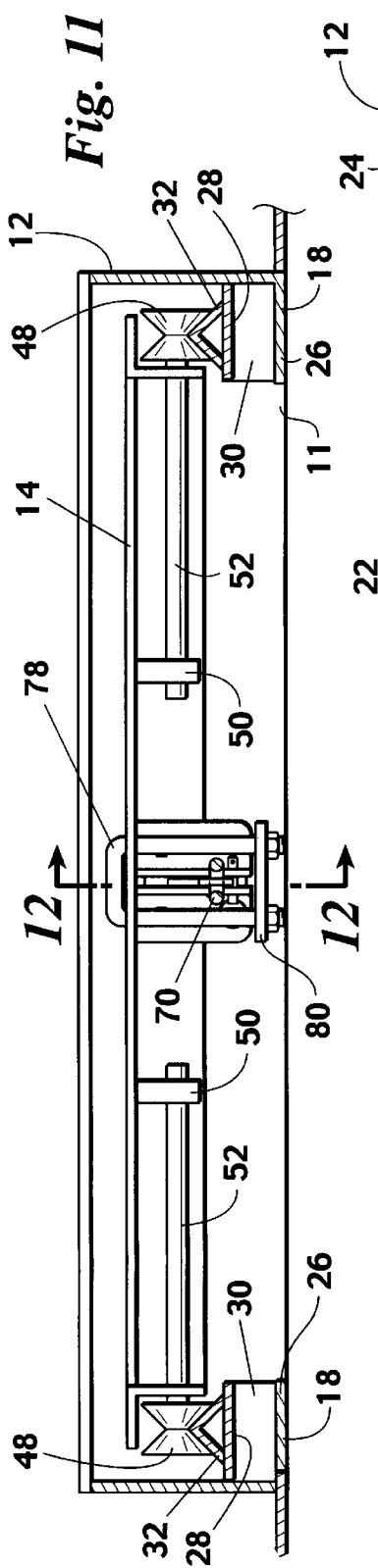

TORNADO SHELTER

BACKGROUND OF THE INVENTION

1. Field of the Invention

The present invention relates to tornado shelters. More particularly, the present invention relates to a tornado shelter having an improved sliding door which facilitates ingress and egress with respect to the tornado shelter.

2. Prior Art

Tornado shelters and storm shelters have been known for many years. Some of these shelters are included in a home or building and other shelters are made separate from any other structure. Many tornado/storm shelters are complicated and difficult to construct. Most tornado/storm shelters do not provide ease for ingress and egress. No tornado/storm shelters of the prior art teach or suggest the simplified sliding door arrangement of the present invention which permits ease of ingress and egress.

SUMMARY OF THE INVENTION

A tornado shelter is provided essentially in the form of a rectangular parallelepiped. The shelter has a rectangular horizontal top and a rectangular horizontal bottom disposed below and parallel to the top and a vertical forward end connected transversely at a pair of ends of the top and bottom. The shelter also has a vertical rear end connected to a second pair of ends of the top and bottom opposite from the forward end. A pair of vertical side members are included in the design and they are connected from the top to the bottom on opposite sides thereof and extending from the rear end to the front end. A substantially rectangular door frame is connected to the top adjacent the front end, the door frame being substantially open at the top and the bottom. An access opening is provided in the top communicating with the interior of the door frame, the door frame having a transverse width slightly less than the transverse width of the tornado shelter and a longitudinal length slightly greater than one-half of the length of the tornado shelter. The sides of the rectangular door frame are connected to the top so that the access opening in the top forms a ledge surrounding at least a portion of the door frame. Longitudinally extending tracks are mounted on the ledge. A flat horizontally extending door is adapted to be mounted in the door frame, the door having rollers thereon adapted to engage the tracks on the ledge, the door having a transverse width slightly less than the transverse width of the door frame and a longitudinal length approximately one-half of the length of the door frame. When the door is mounted in closed position over the opening in the top in the top, the door will be positioned adjacent the front of the tornado shelter. A latch mechanism is attached to the forward edge of the door for securing the door to the front end. A cover plate having vent holes therein covers the rear portion of the door frame. Upon releasing the latch, the door will roll rearwardly on the tracks and into position underneath the cover plate. With the door in this open position, the access opening in the top provides that entry and egress can be achieved simply with respect to the tornado shelter.

BRIEF DESCRIPTION OF THE DRAWINGS

FIG. 5 is a plan view of the door frame utilized in the tornado shelter of the present invention.

FIG. 6 is a sectional view taken along section line 6—6 of FIG. 5.

FIG. 11 is a transverse sectional view taken along section line 11—11 of FIG. 9.

FIG. 14 is a sectional view taken along section line 14—14 showing still further details of the latch.

DETAILED DESCRIPTION OF THE PREFERRED EMBODIMENTS

Figure 1:
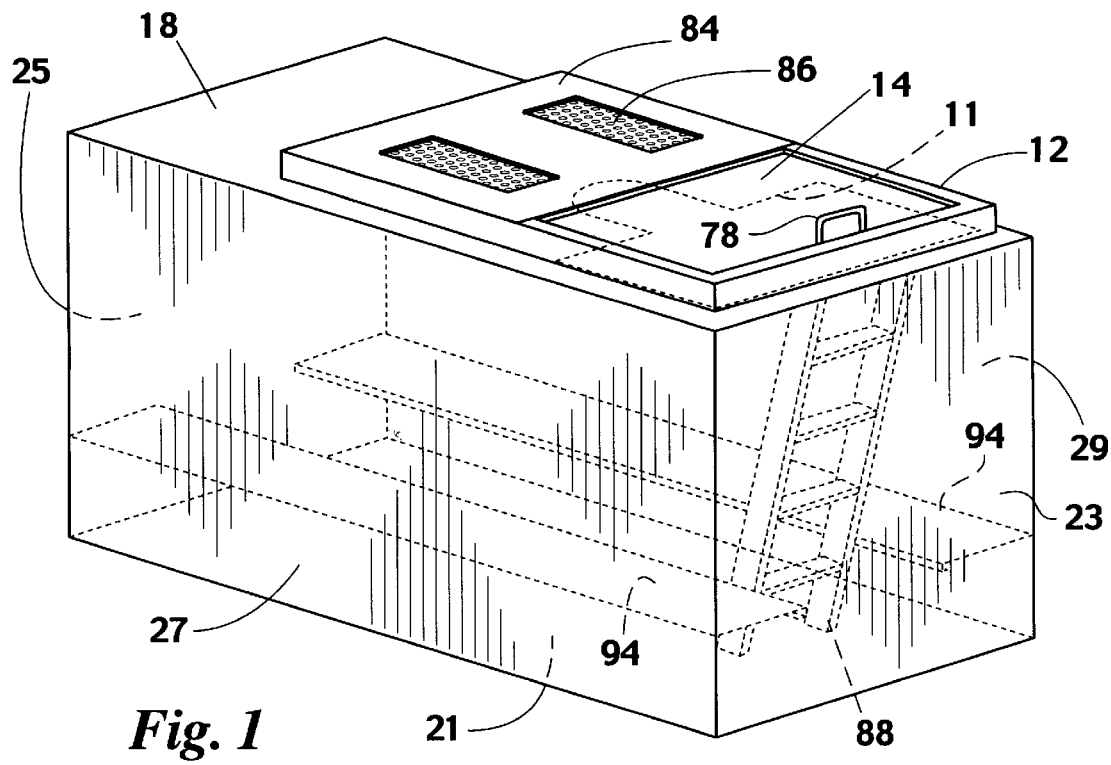
FIG. 1 is a perspective view, with certain hidden parts shown in dotted lines, of the tornado shelter of the present invention.

Referring to the drawings in detail, FIG. 1 shows a rectangular shaped box 10 which is approximately four feet wide, eight feet long, and approximately five feet high. The latter are merely preferred dimensions and are not critical to this invention. Preferably the box will be made of sheets of one-quarter inch steel, which is quite rugged. Opening 11 will be provided at the forward upper end of the box to receive the door attachment frame 12 and the associated door 14. When the door 14 is in the closed position, as shown in FIG. 1, it will occupy the right-hand or forward portion of the attachment frame 14. The rear portion of the attachment frame 14 will be what the door slides under when it moves rearwardly to the open position.

Figure 2:
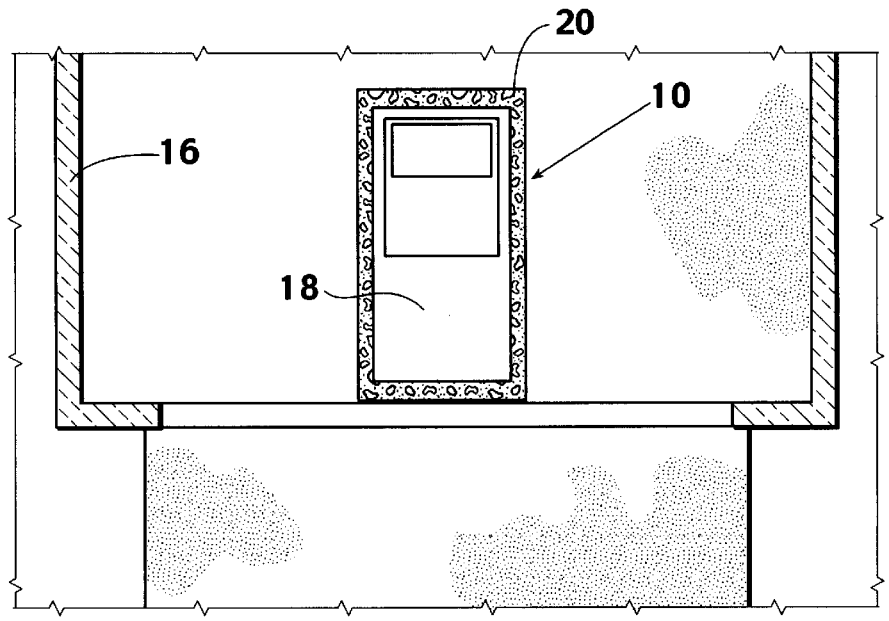
FIG. 2 is a plan view, with certain parts in section, of the tornado shelter of the present invention, shown installed in a garage.

Referring now to FIG. 2, it is contemplated that the entire tornado shelter 10 can be located within a garage 16 of a conventional house, in which case the upper surface 18 of the box 10 will be located below the garage surface an amount commensurate with the height of the door attachment frame 12. That is the upper surface of the access door attachment frame 12 will be flush with the floor of the garage. It should be understood that a cavity of sufficient size would be dug in the floor of the garage 16, the box 10 would be placed in this cavity and the space between the box 10 and the cavity would be filled in with cement 20.

Returning briefly to FIG. 1, the basic geometry of the tornado shelter is that of a rectangular parallelopiped. The tornado shelter shown in FIG. 1 also includes a horizontal bottom 21 which is parallel with, and spaced beneath the top 18. A vertical front member 23 extends transversely across the end of the shelter shown in the right foreground while a vertical rear member 25 (not visible in this Figure) extends across the opposite end of the shelter. Vertical side member 27 (in the left foreground) and opposite vertical side member 29 (not visible in this Figure) extend longitudinally between the transverse ends 23 and 25 and complete the definition of the parallelopiped.

Referring now to FIGS. 5, 6, 9, and 10, the door frame 12 is an essentially rectangular frame, open at the bottom and open at the top and being approximately six inches high more or less. The width of the frame is approximately forty-two inches, slightly less than the width of the box 10 and the length of the frame 12 is slightly less than five feet or just a bit more than one-half of the length of the box 10. The frame 12 is welded along the side edges thereof, to the top 18 of the box 10 over the opening 11 which will underlie the forward portion of the frame 12.

The lateral sides of the door frame are formed by two 4×6" angle members 22. These angle members 22 extend for the full length of the door frame 12 with the six-inch side being essentially vertical and the four inch side extending from the sides horizontally inwardly with respect to the frame. The forward ends 24 of these angle members 22 are cut in approximately two and a half inches to provide an opening in which the door 14 can be inserted. Around the periphery of the opening 11, a ledge 26 is formed by the surrounding portion of the top plate 18. Shelves 28 are provided spaced above the ledges 26 and these shelves are supported in spaced relation with the ledges by vertical supports 30. Tracks 32 shaped in the form of inverted V's are attached to the top of the shelves 28 but are bent at the point 34 where the tracks extend downwardly to the lower right-hand portion of the frame 12 as shown in FIG. 6 to form inclined tracks 36.

Figure 7:
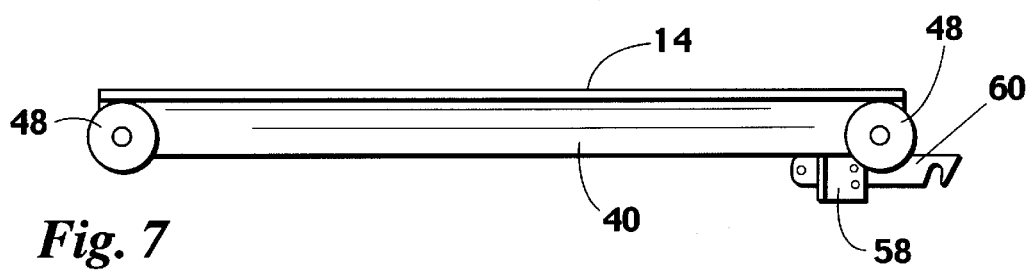
FIG. 7 is a side elevation of the door itself.
Figure 8:
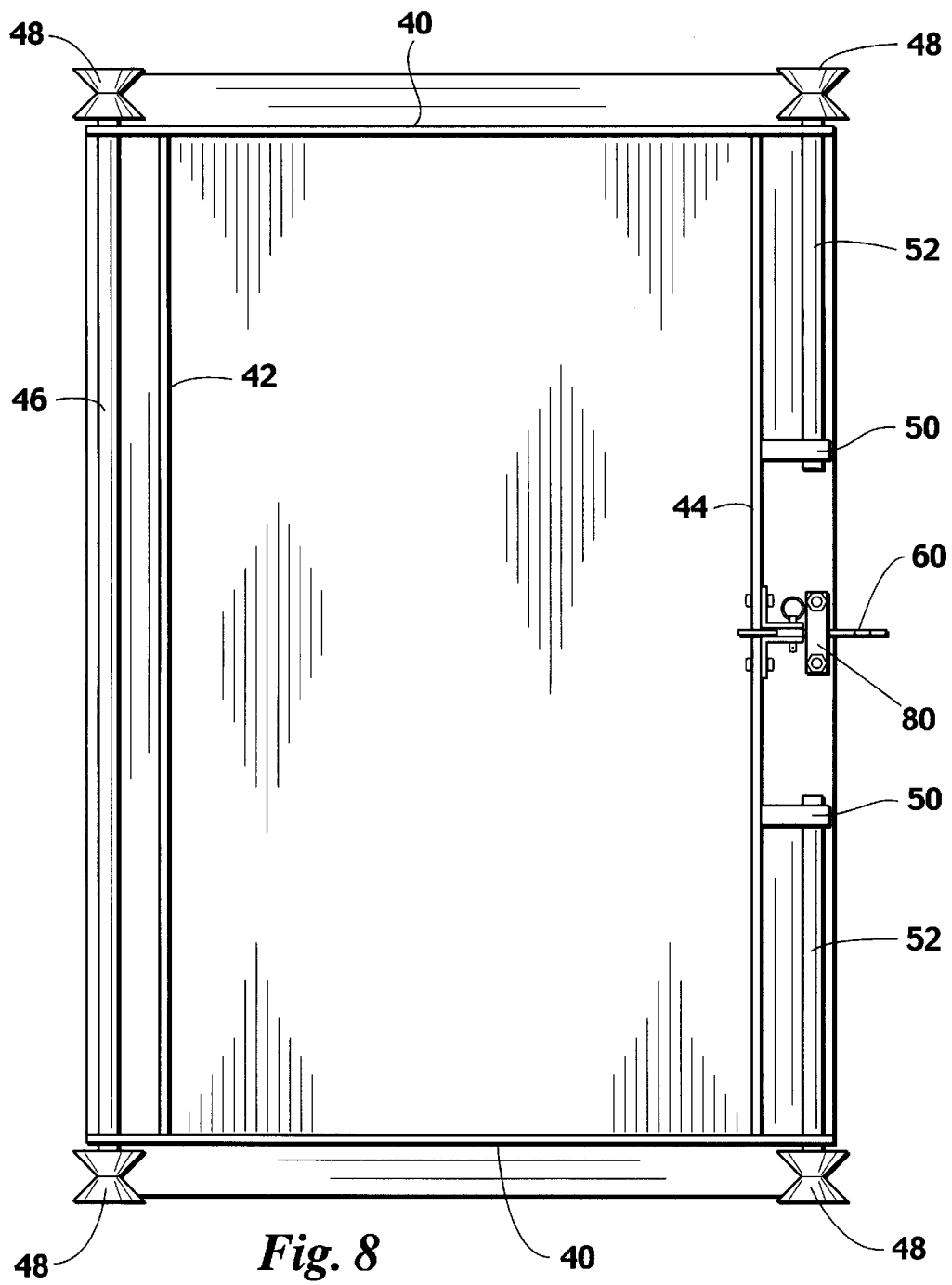
FIG. 8 is a bottom view of the door shown in FIG. 7.
Figure 9:
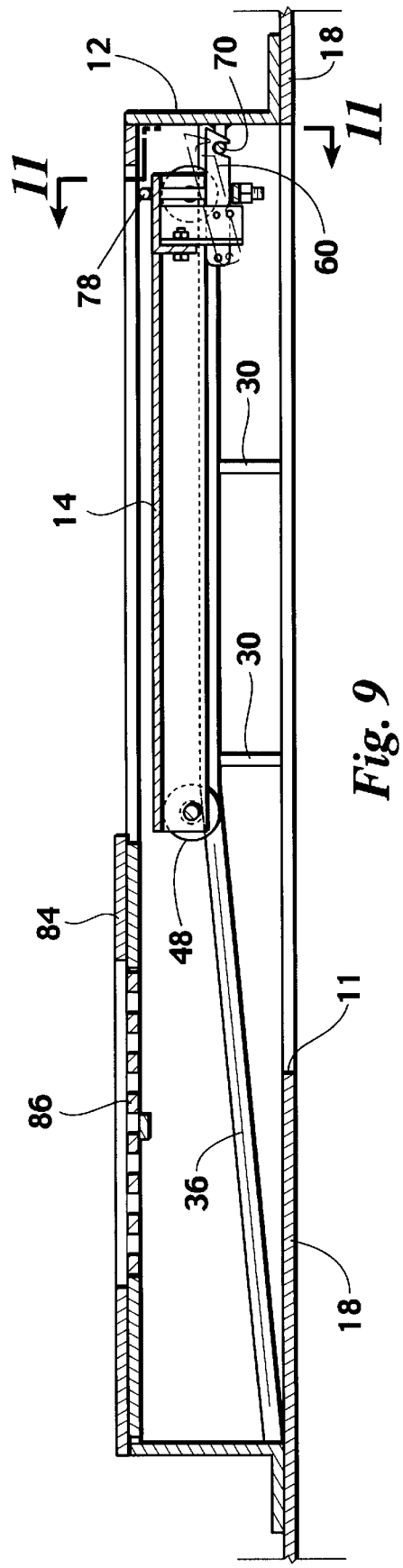
FIG. 9 is a longitudinal sectional view through the door and door frame with the door in the closed position.
Figure 10:
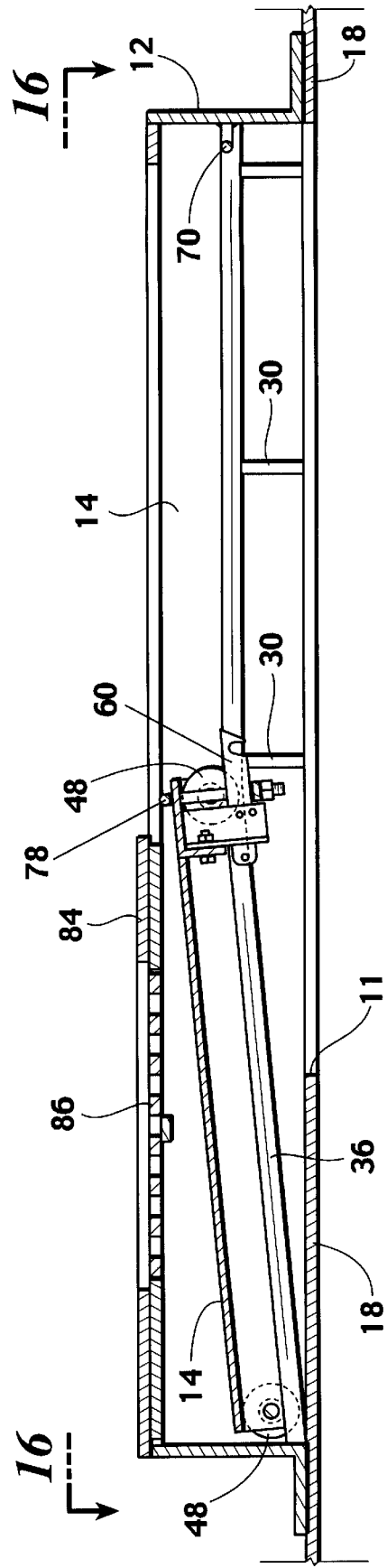
FIG. 10 is a view similar to FIG. 9 but showing the door in an open position.

As best shown in FIGS. 7 through 10 the door 14 comprises a substantially flat horizontal plate whose transverse dimension is slightly less than the transverse dimension of the frame 12 as best shown in FIG. 11 and a longitudinal dimension approximately equal to one-half the longitudinal length of the door frame 12 as shown in FIG. 9 and 10.

Referring now to FIGS. 7 and 8 which show the door alone, the door 14 in FIG. 7 is shown in side elevation and in FIG. 8 from the bottom. A pair of longitudinal flanges 40 extend downwardly adjacent the sides of the door slightly inboard. A pair of transverse plates 42 and 44 extend along the bottom between the transverse plates 40, the plate 44 being adapted to support the latch as will hereinafter appear. A shaft 46 extends between the rear ends of the plates 40 and support rollers 48 on the ends thereof, the rollers being adapted to engage the track 32. At the forward side of the door 14, a pair of short plates 50 extend horizontally to provide support for sub shafts 52 on which another pair of rollers 48 are mounted.

Figure 13:
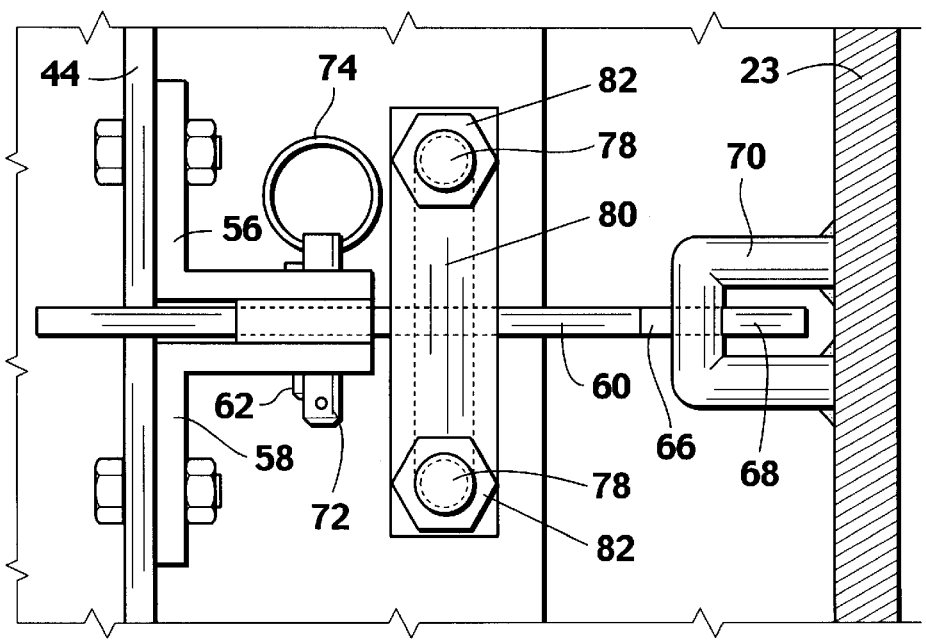
FIG. 13 is a sectional view taken along section line 13—13 showing further details of the latch.

A latch bracket 54 is bolted to the transverse cross member 44 as best shown in FIGS. 13 and 14. The bracket 54 consists of two parts 56 and 58 which is separated by a gap in which a latch bolt 60 is adapted to pivot around the pivot pin 62. The rear end of the latch bolt 60 is provided with a hole 64 through which a rope or wire (not shown) may be inserted for the purpose of tilting the latch 60. The forward end of the latch is provided with a notch 66 which terminates in a hook 68 which is adapted to be received in a U-shaped member or eye 70 that is connected to the front member.

A detent pin 72 having a ring 74 at one end thereof is adapted to be inserted in a hole of the latch to keep the same level when the door is moved to the open position. The door 14 is provided with a pair of holes 76 in which an inverted U-shaped member or handle 78 is adapted to be received. The lower ends of the U-shaped handle 78 connect with a cross member 80 which is secured to the lower ends of the U-shaped member by nuts 82.

Figure 3:
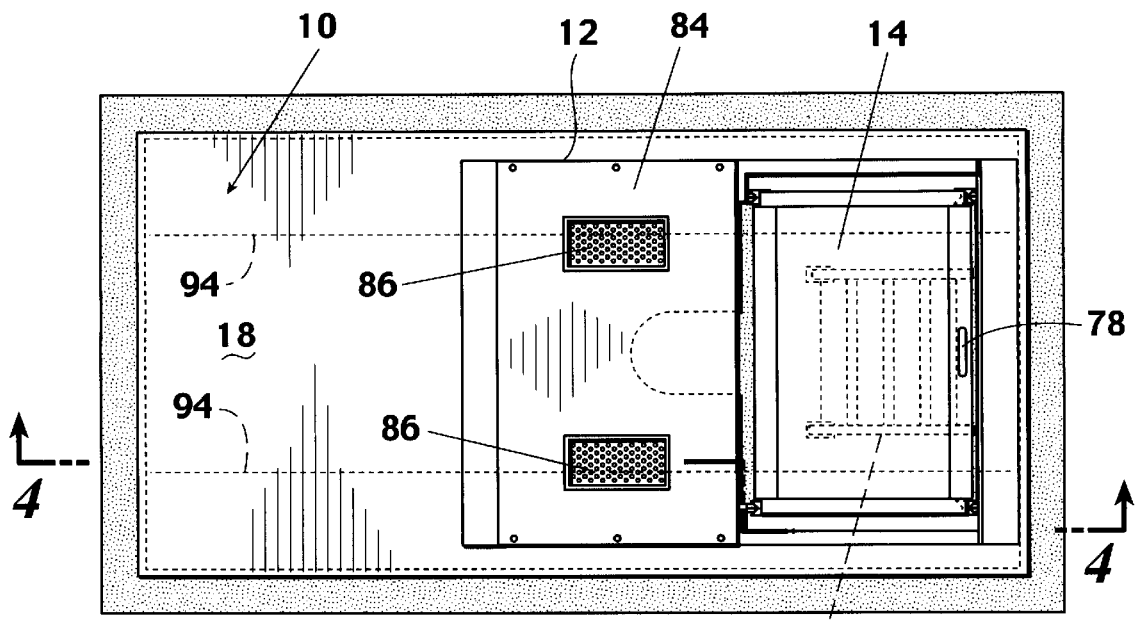
FIG. 3 is a top plan view, with certain hidden parts shows in dotted lines, of the tornado shelter of the present invention.
Figure 4:
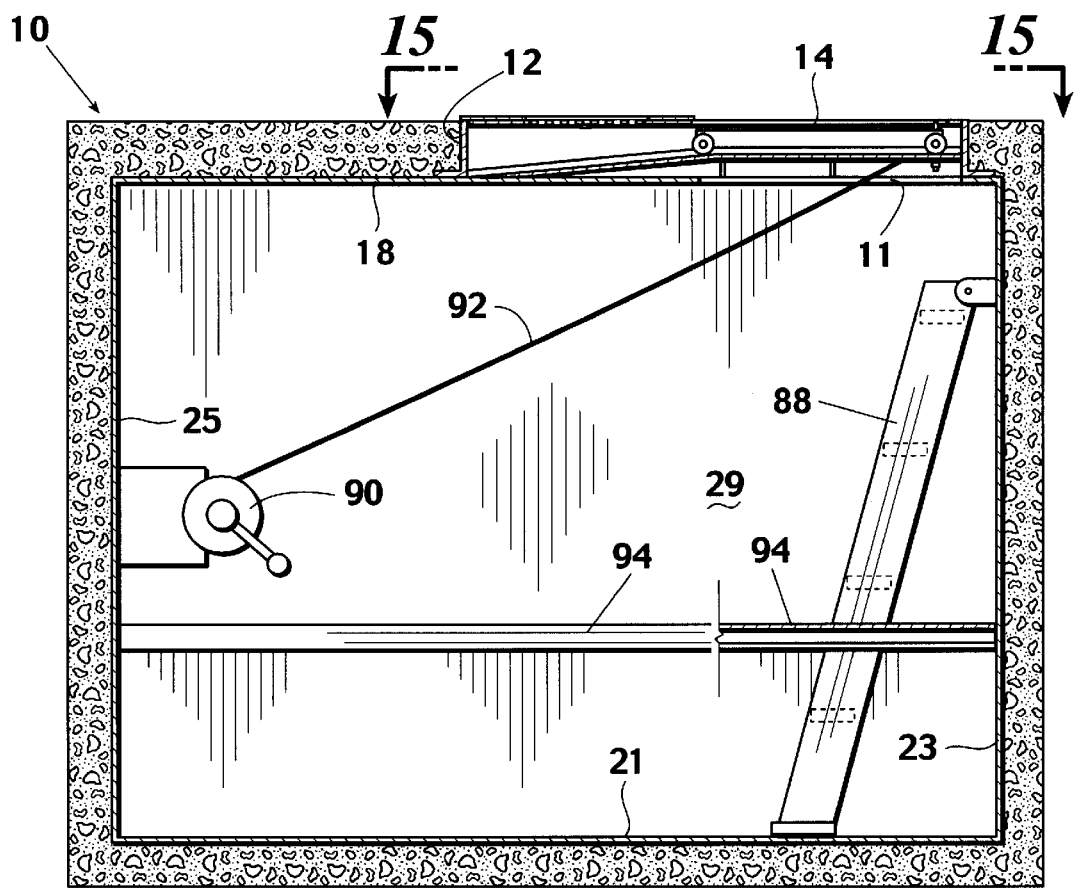
FIG. 4 is a sectional view taken along section line 4—4 of FIG. 1.
Figure 15:
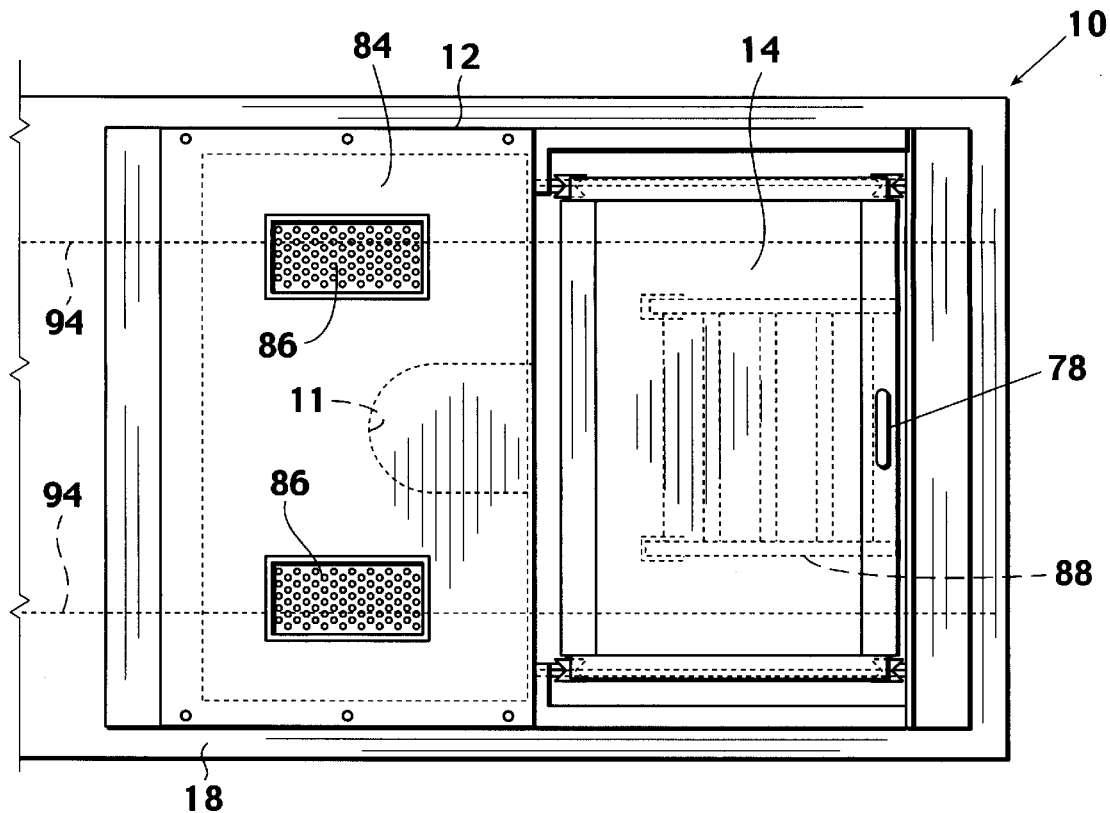
FIG. 15 is a plan view of the forward portion of the tornado shelter, with certain hidden parts shown in dotted lines, and showing the door in a closed position.
Figure 16:
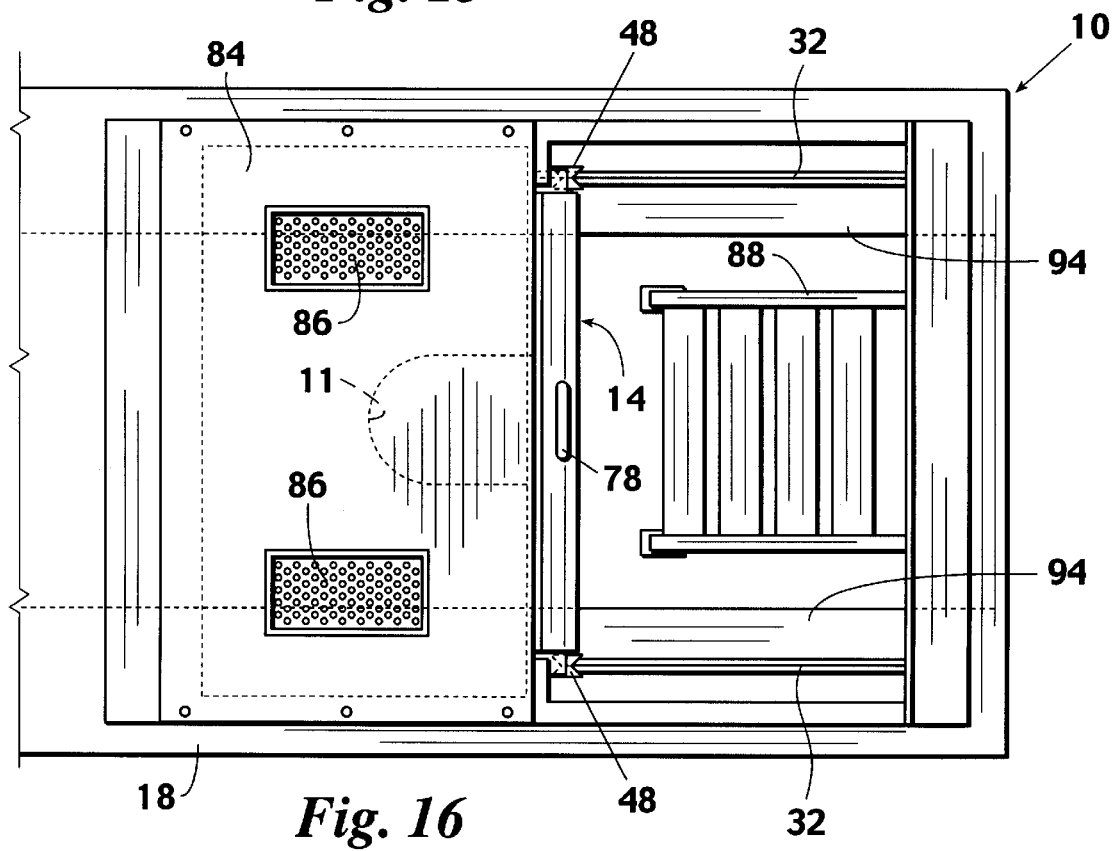
FIG. 16 is a view similar to FIG. 15 but showing the door in an open position.

The rear portion of the door frame 12 is provided with a cover plate 84 which includes vent openings 86 therein to provide ventilation for the occupants of the tornado shelter when the door 14 is closed. In the closed position of the door 14, as shown in FIGS. 3, 4, and 15, the door 14 will be to the right of the cover plate 84 and substantially coplanar therewith. However, when the door is moved to the open position as shown in FIGS. 10 and 16, the door 14 will be positioned beneath the cover plate 84. The sides of the cover plate 84 can be connected to the door frame 12 by means of bolts or screws as shown.

In order to permit ingress and egress with respect to the tornado shelter 10, a ladder 88 can be located in any convenient position within the interior of the tornado shelter 10.

Figure 12:
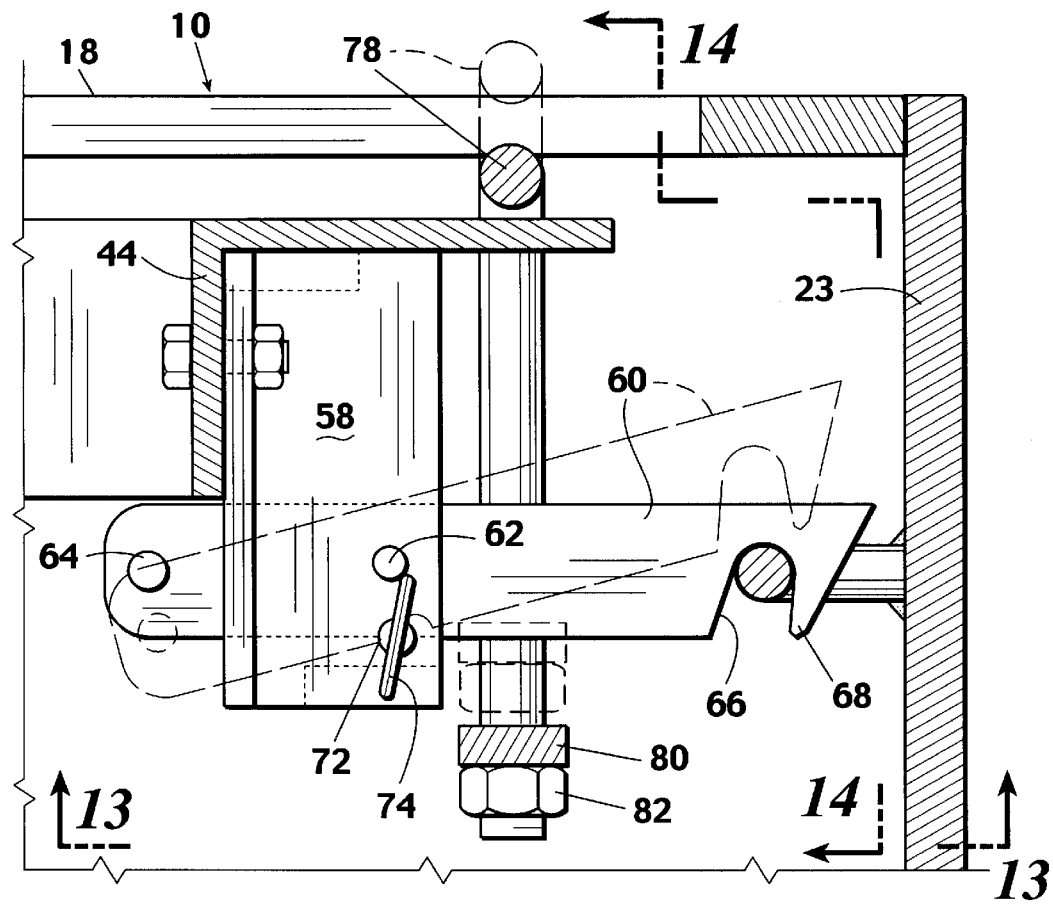
FIG. 12 is a transverse sectional view taken along sectional line 12—12 showing details of the latch.

After entering the tornado shelter, and when a sufficient number of occupants are present, if the door 14 is pushed toward the right, from the position shown in FIG. 10, the door will move up the tracks 36 and proceed forwardly until the end of the latch 60 is received in the eye 70. When it is desired to open the door, a rope (not shown) or cable connected to the hole 64 will permit the tilting of the latch 60 to the dotted-line position shown in FIG. 12, at which time the door 14 will move to the left under the influence of gravity to the position shown in FIG. 10. In the unlikely event that the occupants of the tornado shelter have difficulty opening the door a small winch 90 can be provided as shown in FIG. 4 such that a line 92 connected to the winch can also be secured to the underside of the door 14, at any convenient location thereon such that turning of the winch 90 will pull the door 14 to the left. Shelves or benches 94 can be provided along the lateral sides 27 and 29 within the tornado shelter.

Whereas the present invention has been described in particular relation to the drawings attached hereto, other and further modifications, apart from those shown or suggested herein, may be made within the spirit and scope of this invention.

What is claimed is:

1. A tornado shelter shaped essentially in the form of a rectangular parallelepiped comprising a rectangular horizontal top, a rectangular horizontal bottom disposed below and parallel to the top, a vertical forward end connected transversely to a pair of ends of the top and bottom, a vertical rear end connected transversely to a second pair of ends of the top and bottom opposite from said forward end, a pair of vertical side members connecting the top and the bottom on opposite sides thereof and extending longitudinally from the rear end to the front end, a substantially rectangular door frame connected to the top adjacent the front end, an access opening in the top communicating with the interior of the door frame, longitudinally extending tracks mounted in the door frame, a flat horizontally extending door adapted to be mounted in the door frame, the door having rollers thereon adapted to engage the tracks, the door being mounted in closed position over the opening in the top when the door is adjacent the front of the tornado shelter, a latch mechanism attached to the forward edge of the door for securing the door to the front end, a cover plate having vent holes therein covering the rear portion of the door frame, means for releasing the latch on the door and for rolling the door rearwardly into position underneath the cover plate and exposing the access opening in the top so that entry and egress can be achieved with respect to the tornado shelter.

2. A tornado shelter as set forth in claim 1 wherein the tracks are elevated adjacent the forward end of the tornado shelter and are downwardly and rearwardly inclined beneath the cover plate whereby, when the latch on the door is released, the door will roll rearwardly under the influence of gravity.

3. A tornado shelter as set forth in claim 1 wherein the door frame is substantially open at the top and bottom, the door frame having a transverse width slightly less than the transverse width of the tornado shelter and a longitudinal length slightly greater than one-half of the length of the tornado shelter, the sides of the rectangular door frame being connected to the top.

4. A tornado shelter as set forth in claim 1 wherein the access opening in the top forms a ledge surrounding at least a portion of the inside of the door frame and wherein the longitudinally extending tracks are mounted on the ledge.

5. A tornado shelter as set forth in claim 4 wherein the tracks are spaced above the ledge adjacent the forward end of the tornado shelter and are downwardly and rearwardly inclined beneath the cover plate whereby, when the latch on the door is released, the door will roll rearwardly under the influence of gravity.

* * * * *